United States Patent [19]

Tsai

[11] Patent Number: 5,895,166
[45] Date of Patent: Apr. 20, 1999

[54] ELASTIC RING FOR WHEEL SHROUD

[76] Inventor: Yung-Pao Tsai, No. 15, Alley 7, Lane 248, Chung-Ching Rd., Jen-Te Hsiang, Tainan

[21] Appl. No.: 08/927,396

[22] Filed: Sep. 10, 1997

[51] Int. Cl.⁶ ........................................ B60B 7/12
[52] U.S. Cl. ...................... 403/4; 403/361; 301/37.32
[58] Field of Search ........................... 277/631, 380; 285/12; 301/108.1, 108.3, 37.32, 37.31, 37.33, 23, 26; 403/3, 4, 291, 305, 361; 2/321; 267/69; 24/453, 588, 686; 63/3.1, 3.2; 29/402.09

[56] References Cited

U.S. PATENT DOCUMENTS

| 2,253,435 | 8/1941 | Lang | 403/305 X |
| 2,730,381 | 1/1956 | Curtiss | 29/402.09 X |
| 4,917,441 | 4/1990 | Iida | 301/37.36 |
| 5,095,178 | 3/1992 | Hollingsworth | 403/305 X |
| 5,138,855 | 8/1992 | Faris | 63/3.1 X |

FOREIGN PATENT DOCUMENTS

03-65401  3/1991  Japan ................................ 301/37.33

Primary Examiner—Eric K. Nicholson
Assistant Examiner—Greg Binda
Attorney, Agent, or Firm—Rosenberg, Klein & Bilker

[57] ABSTRACT

An adjustable jointer of an elastic ring for wheel shroud has a diameter which is able to be changed by adjusting the length of the jointer. The elastic ring consists of an elastic ring attached on a jointer, in which the jointer comprises a socket joint and a plug joint connecting together in plug-in joint. There are one or more collars attaching on the outside surface of the socket joint, which can be tore off to put on the latch of the plug joint to stretch the length of the jointer so as to increase the diameter of the elastic ring. Therefore by adding or removing the number of said collars, the diameter of the elastic ring can be changed to reach the goal of suiting different sizes of the wheel shrouds.

1 Claim, 10 Drawing Sheets

ELASTIC RING FOR WHEEL SHROUD

BACKGROUND OF THE INVENTION

1. Field of the Invention

The present invention relates to an elastic ring for wheel shroud, and more particularly to an adjustable jointer of elastic ring in which the diameter of the elastic ring is able to change by adjusting the length of the jointer.

2. Description of Prior Art

Figure 7:
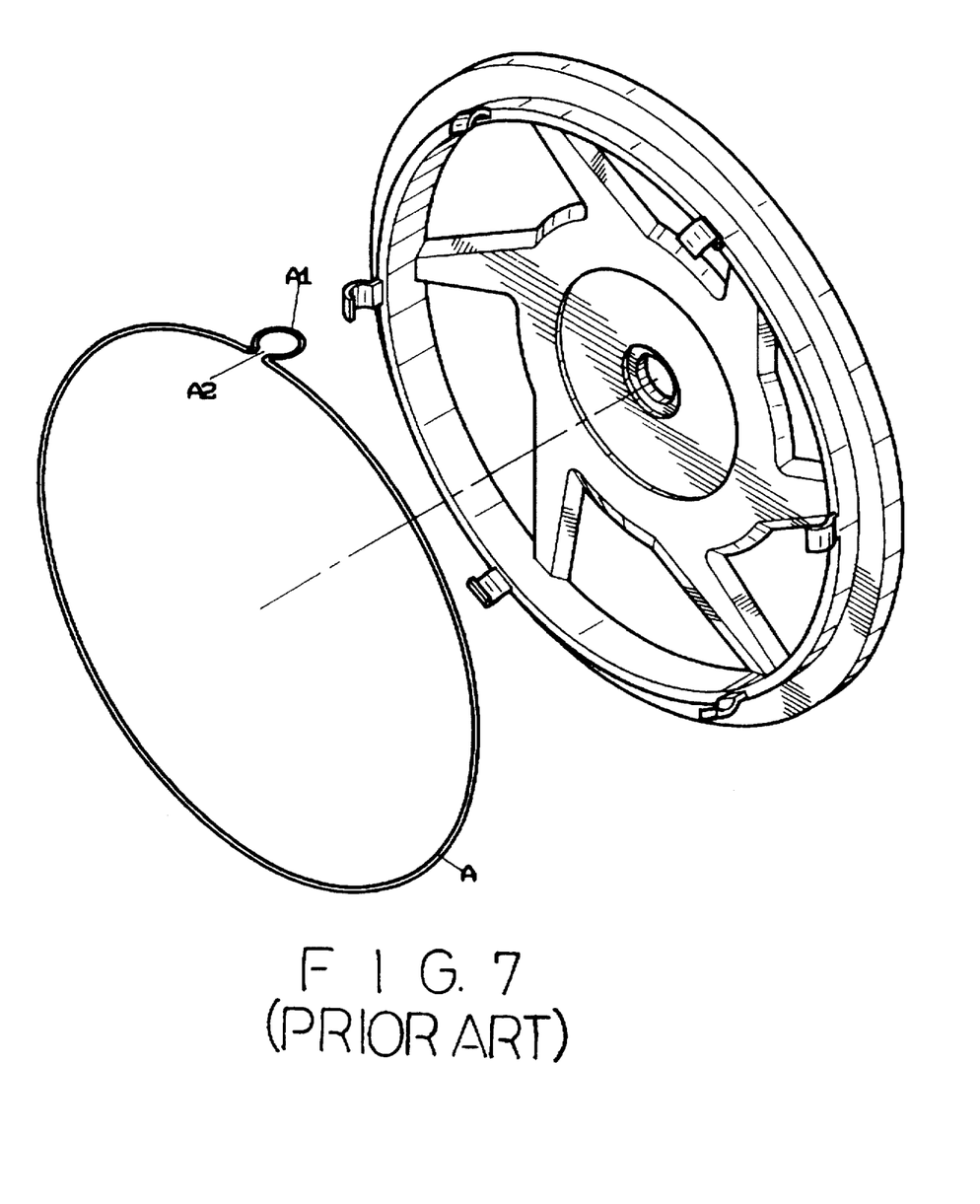
FIG. 7 is a solid view of the first prior art.
Figure 8:
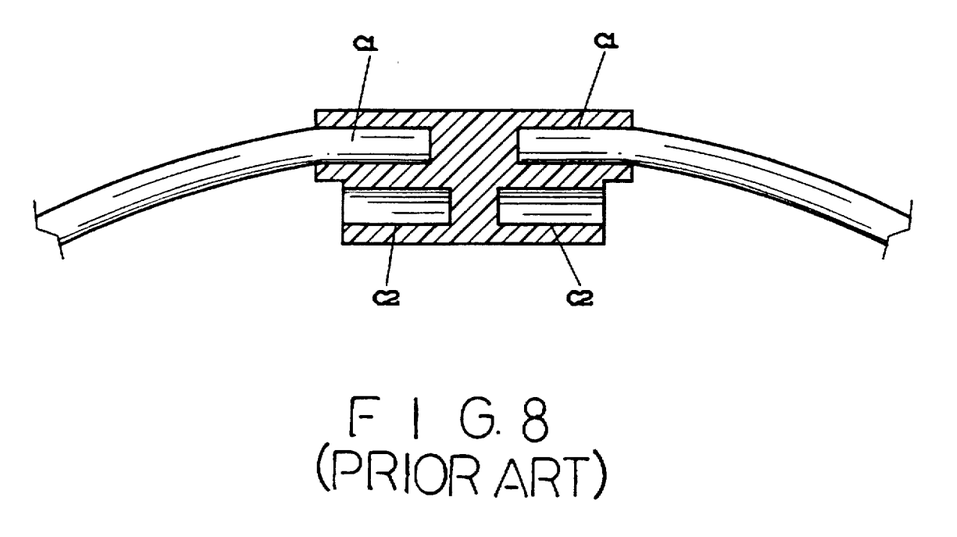
FIG. 8 is a cross-section view of the second prior art.
Figure 9:
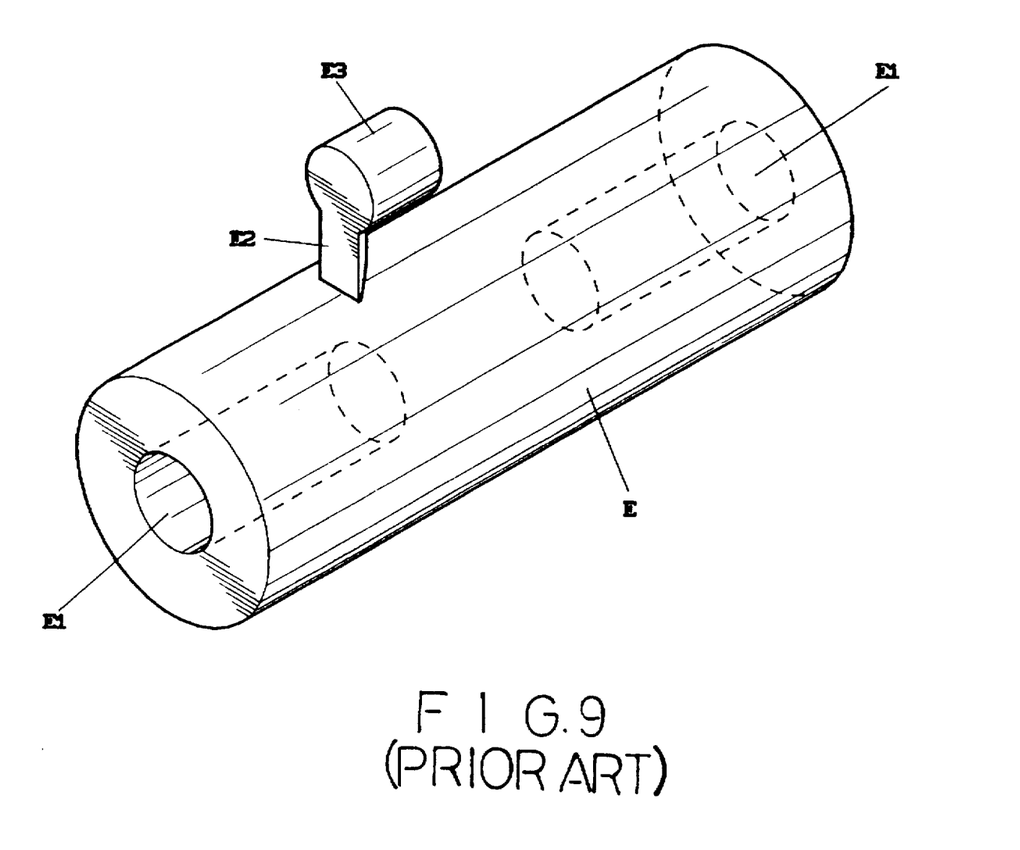
FIG. 9 is a solid view of the third prior art.
Figure 10:
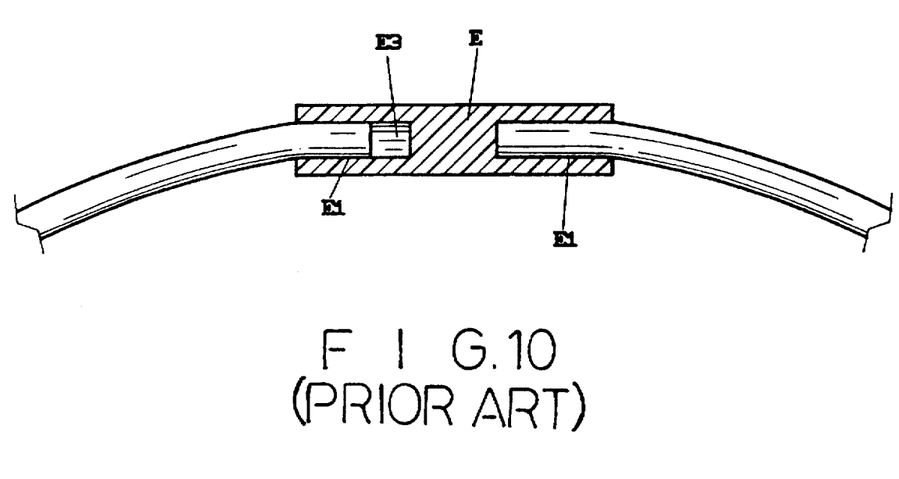
FIG. 10 is a cross-section view showing practising of the third prior art.

In accordance with the conventional elastic rings, they can be divided into three styles as follows. The first, as shown on FIG. 7, is a loop elastic ring A making of a steel wire with an Ω-shaped segment A1 for predisposing a distance A2 at the open end, by means of which the diameter of the elastic ring A can be changed in a very limited range. But for meeting the necessaries of variety wheel shrouds, a bigger adjusting range of the elastic ring A is demanded so that the wheel shroud is fixed on the wheel rim more sturdily. Secondly, as shown on FIG. 8, the ring has a couple of fixing holes C1 and C2 formed on a connecting piece for fixing the two free ends of the unclosed elastic ring A in different couple so that diameter of the elastic ring A can be changed following the pre-setting sizes. It is not difficult to find that such elastic ring A can fit to a very small range, and for different sizes a plural moulds should be produced, thereby the production cost is increased. Later a new elastic ring came out, as shown on FIG. 9, in which a connecting bar E has a couple of coaxial fixing holes E1 formed at both ends, and a tearing spacer E3 attached on the outside wall via a connecting strip E2 preparing for inserting into the fixing hole E1 to change the fixing inserting depth of the end of the elastic ring A, further to change the diameter of the elastic ring A, as shown on FIG. 10. But as inserting the spacer E3 into the fixing hole E1, there exists the air resistance, on the other hand, the spacer E3 is tore off from the connecting strip E2, some raw edge will attach to the rim of the spacer E3, sometimes the connecting strip E2 attaches on so that the spacer E3 is not able to be inserted into the fixing hole E1 without eliminating them out, so an eliminating process has to be added.

OBJECTS AND SUMMARY OF THE INVENTION

It is therefore a main object of the present invention to provide an elastic ring for wheel shroud which length can be adjusted further to change the diameter of the elastic ring.

This object is achieved by an elastic ring that consists of an elastic ring attaching on a jointer, in which the jointer comprises a socket joint and a plug joint connecting together in plug-in joint. There are one or more collars attaching on the outside surface of the socket joint, which can be tore off to put on the latch of the plug joint to stretch the length of the jointer so as to increase the diameter of the elastic ring. Therefore by adding or removing the number of the collars, the diameter of the elastic ring can be changed to reach the goal of fitting different sizes of the wheel shrouds.

DETAILED DESCRIPTION OF THE PREFERRED EMBODIMENTS

Figure 1:
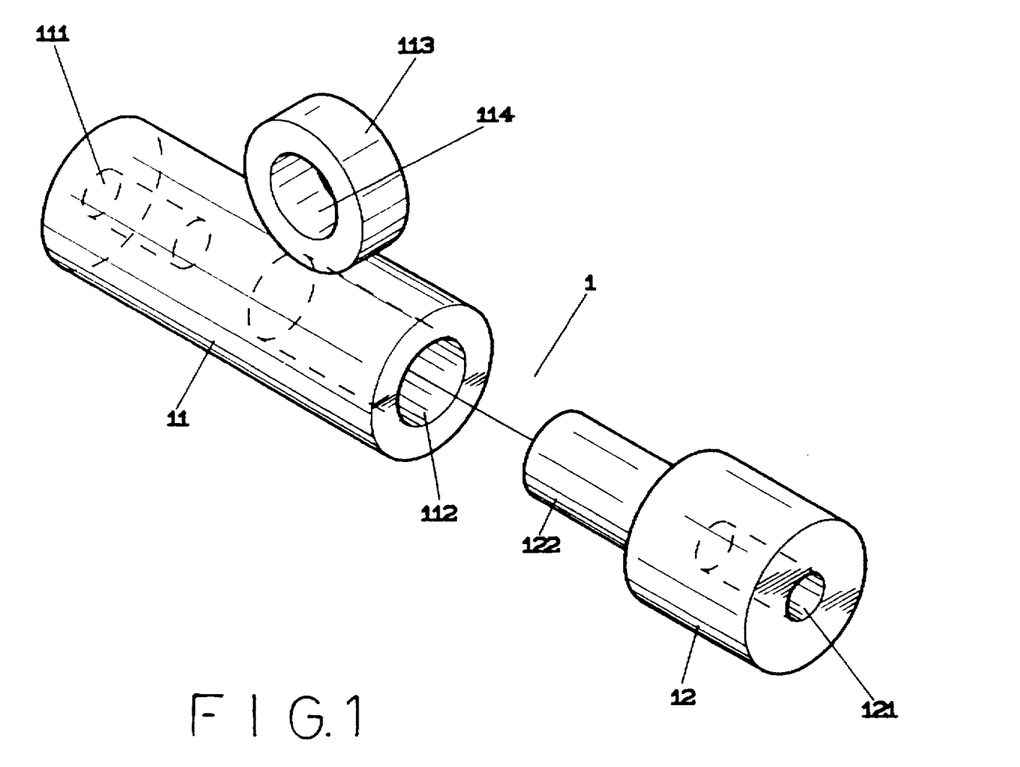
FIG. 1 is an exploded view of the present invention.

Referring to FIG. 1, the present invention consists of an elastic ring 2 (as shown on FIG. 2) fixing on a jointer 1, in which the jointer 1 comprises a socket joint 11 and plug joint 12.

The socket joint 11 is a cylinder with a fixing hole 111 at one end, and a socket 112 at the other end; both of the fixing hole 111 and socket 112 are blind holes; there is an integral collar 113 formed on the outer surface, the collar 113 has a central hole 114 which has an inner diameter equal to the outer diameter of the latch 122 so that the latch 122 is able to be inserted therein.

Figure 2:
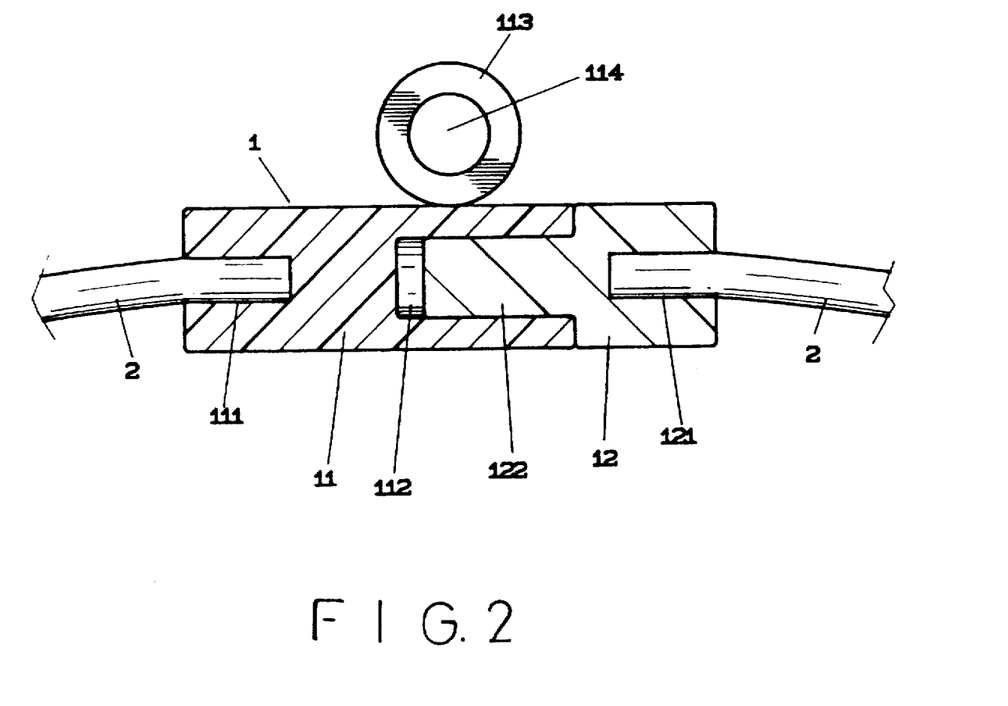
FIG. 2 is a cross-section view showing the first state in practising of the present invention.

The plug joint 12 has a fixing hole 121 formed at one end having an inner diameter equals to the inner diameter of the fixing hole 111 of the socket joint 11, and a latch 122 at the other end, which can fit into the socket 112 of the socket joint 11;

In combining, referring to FIG. 2, the elastic ring 2 is fixed on the jointer 1 by fixing both free ends of the elastic ring 2 into the fixing holes 111 and 121 on the socket joint 11 and the plug joint 12 of the jointer 1, respectively.

Figure 3:
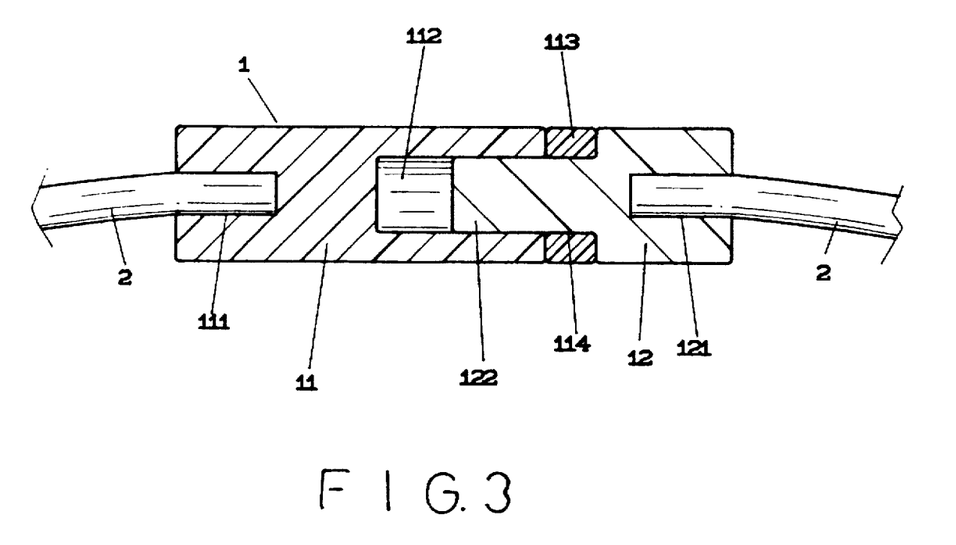
FIG. 3 is a cross-section view showing the second state in practising of the present invention.

In practising, according to the necessary of the wheel shroud, deciding whether to add the collar 113 between the socket joint 11 and the plug joint 12 to change the diameter to fit the wheel shroud, if not, the socket joint 11 and the plug joint 12 can be plugged in together directly. When necessary, tearing the collar 113 off from the socket joint 11, then put on the latch 122 of the plug joint 12, finally inserting the latch 122 extending from the central hole 114 into the socket 112 of the socket joint 11 fixing them together to increase the length of the jointer 1 further to increase the diameter of the elastic ring 2.

Figure 4:
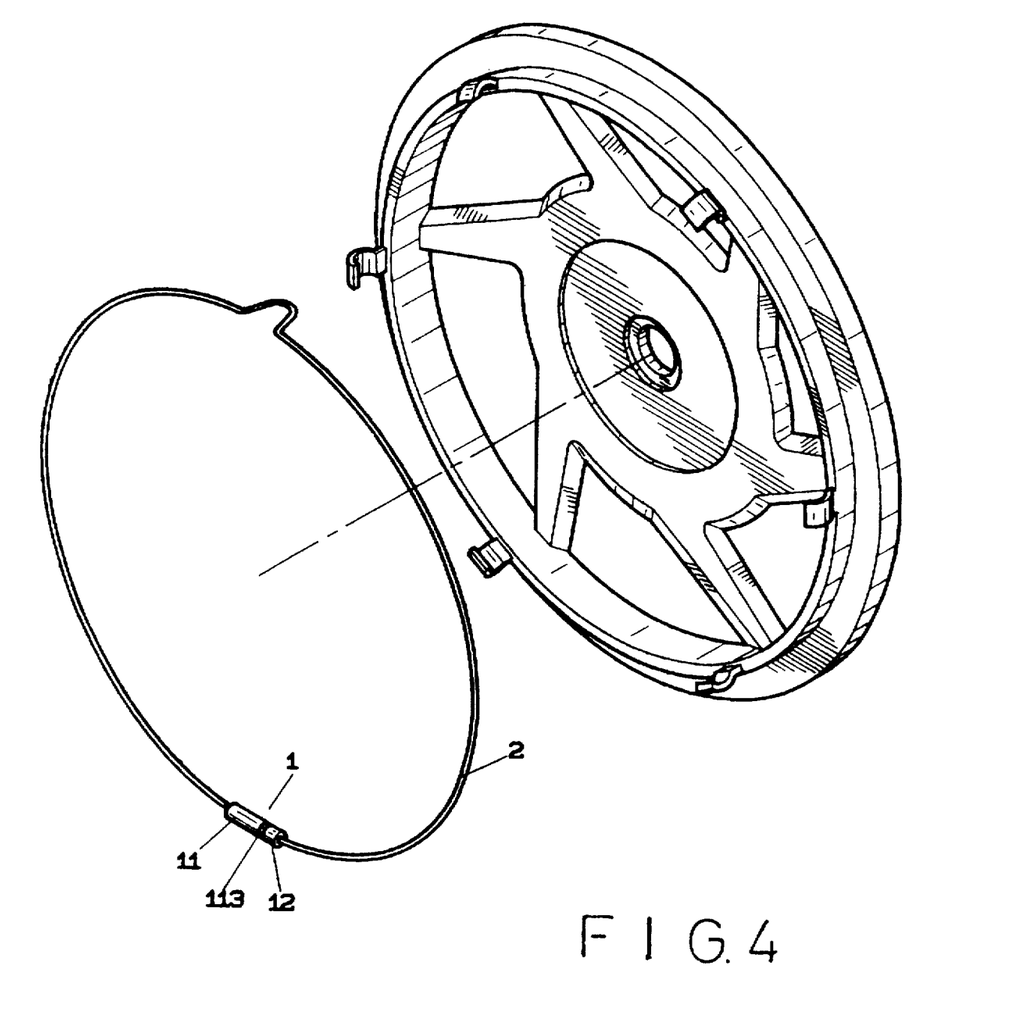
FIG. 4 is a solid view showing the third state in practising of the present invention.
Figure 5:
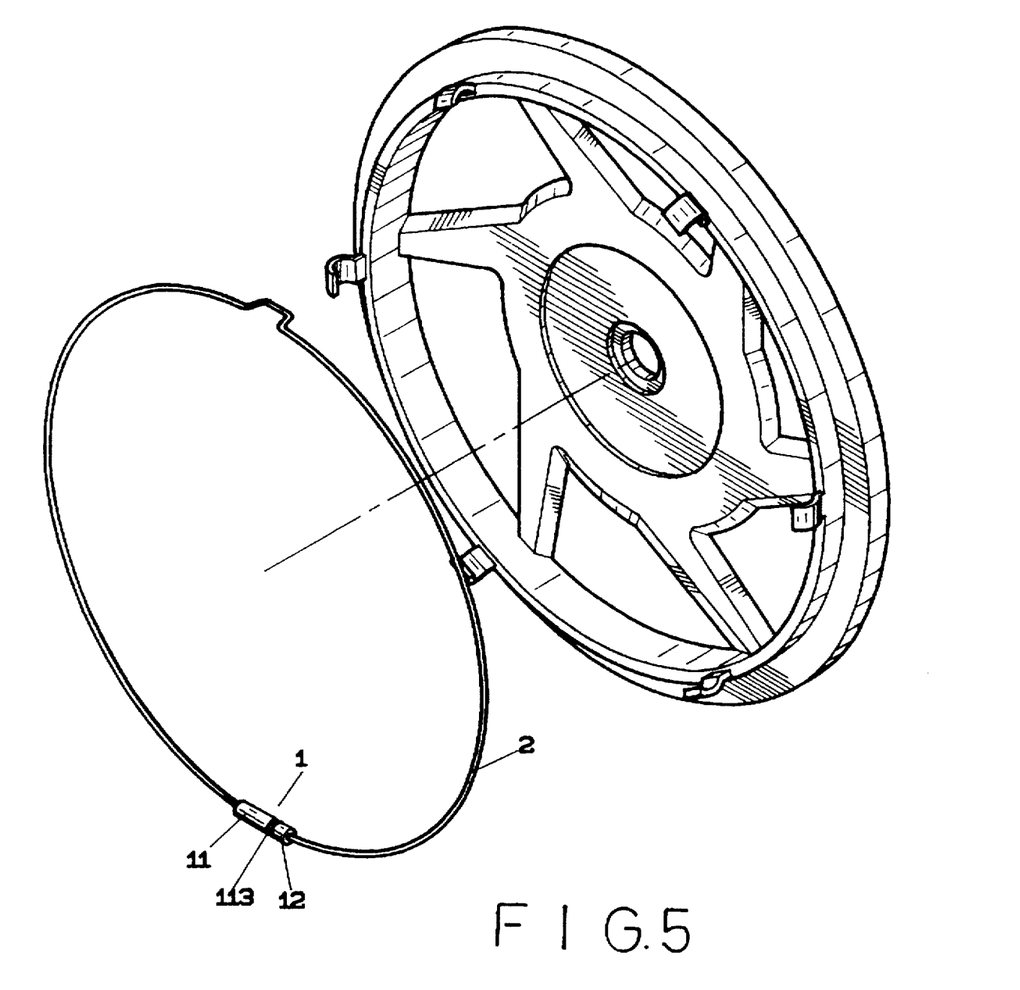
FIG. 5 is a solid view showing the fourth state in practising of the present invention.

Referring to FIG. 4 and FIG. 5, for avoiding interfering with the air valve of the wheel, the elastic ring is bent to form a gap coordinating to the shape of the air valve of the wheel.

Figure 6:
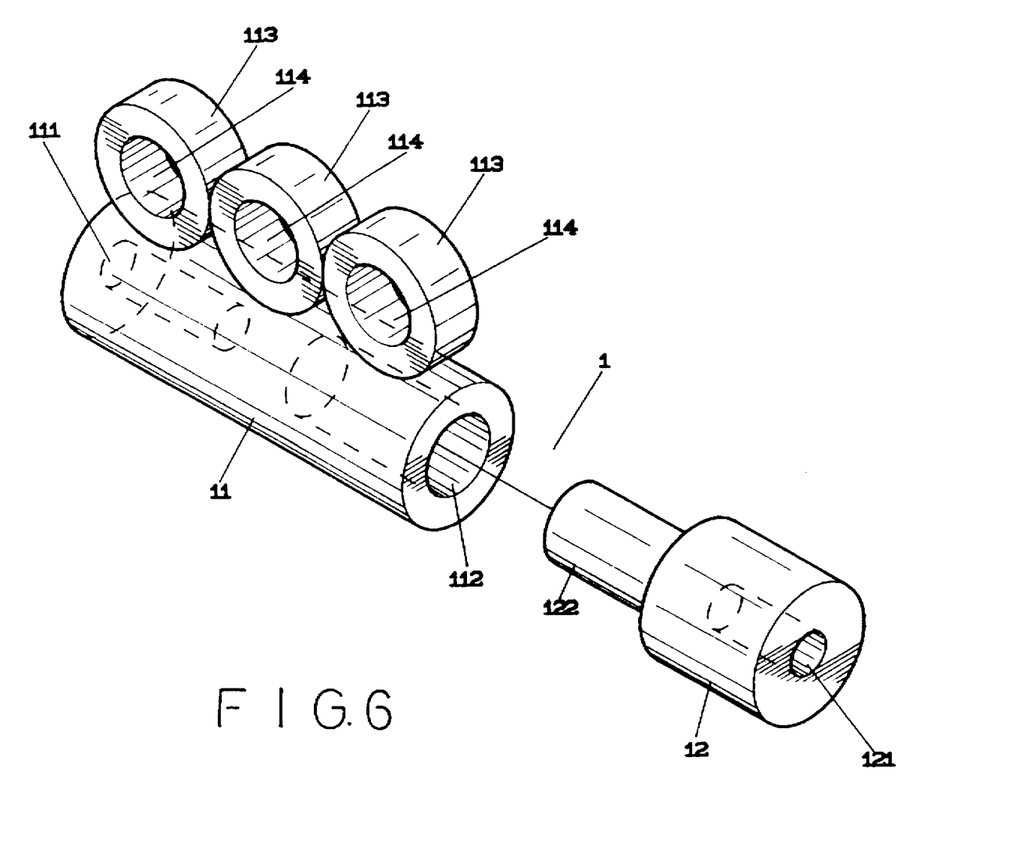
FIG. 6 is a solid view showing the fifth state in practising of the present invention.

FIG. 6, has shown an other embodiment which jointer 1 is formed with socket joint 11 and plug joint 12. The socket joint 11 includes fixing hole 111, socket 112 and collar 113, whereas the collar 113 includes a centre hole 114. The plug joint 12 has a fixing hole 121 and latch 122. The collars 113 attached on the outside surface of the socket joint 11 can be two or more in numbers for meeting the necessary of some larger size wheel shrouds.

I claim:

1. An elastic ring for wheel shroud comprising an unclosed elastic ring fixing on a jointer, in which said jointer comprising a socket joint and a plug joint, wherein said socket joint having a fixing hole at one end, and a socket at the other end; said plug joint having a fixing hole at one end, and a latch to be inserted into said socket of said socket joint, and the improvements comprising said socket having at least two collars attached on the outside surface of said socket joint, and said collars can be tore off to put on said latch of said plug joint to place between said socketjoint and said plug joint.

* * * * *